Dec. 12, 1967 W. W. KELLY 3,357,536
CONTAINER FEEDING MECHANISM
Filed Aug. 8, 1966 2 Sheets-Sheet 2
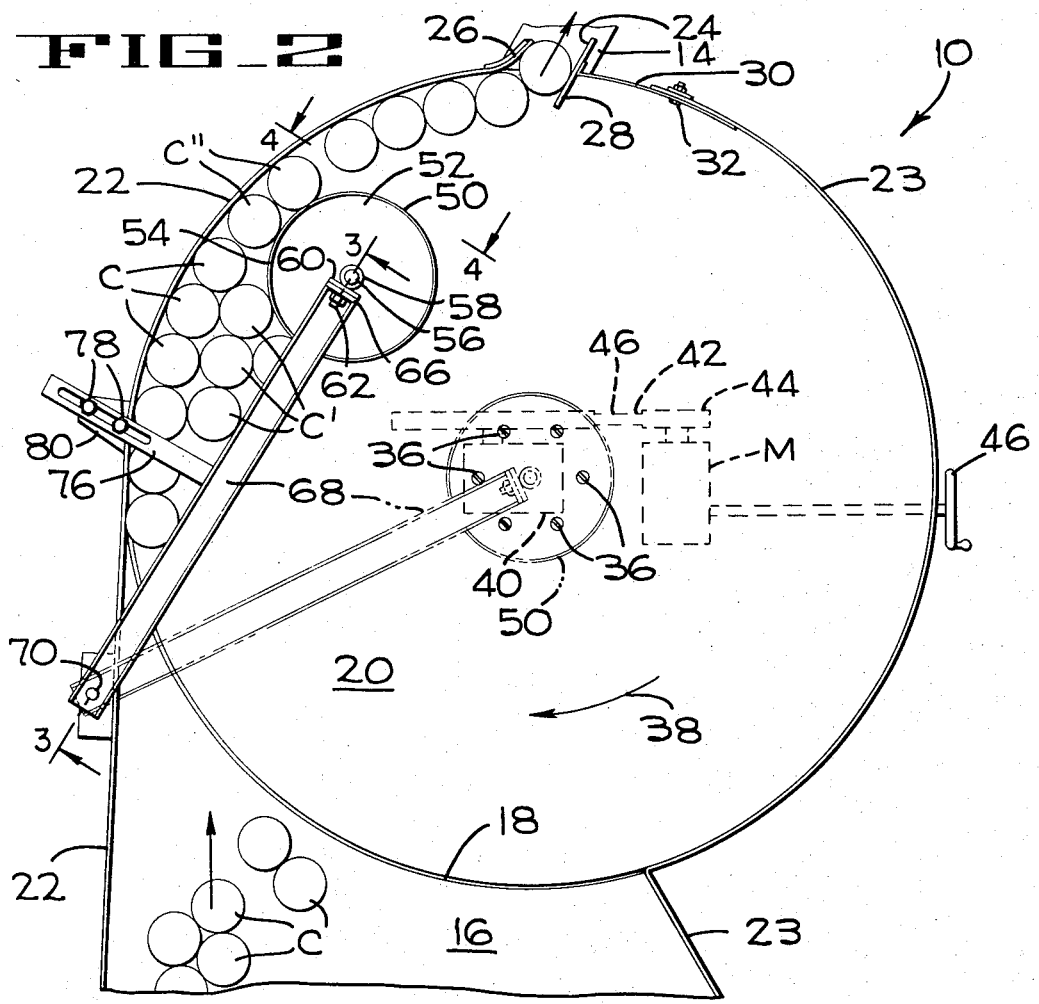
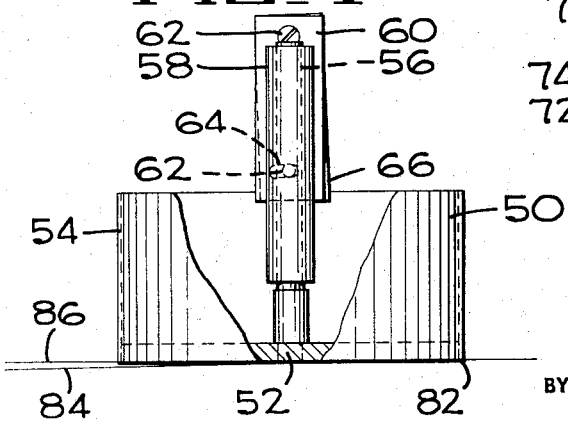
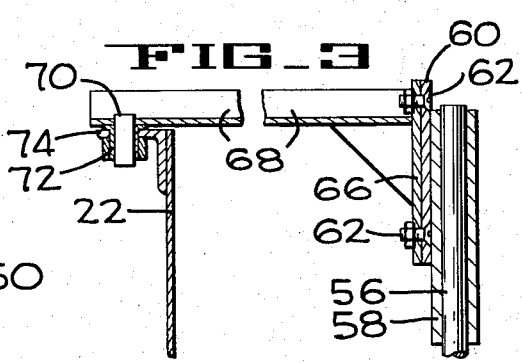
INVENTOR
WALTER W. KELLY
BY Francis W. Anderson
ATTORNEY United States Patent Office 3,357,536
Patented Dec. 12, 1967

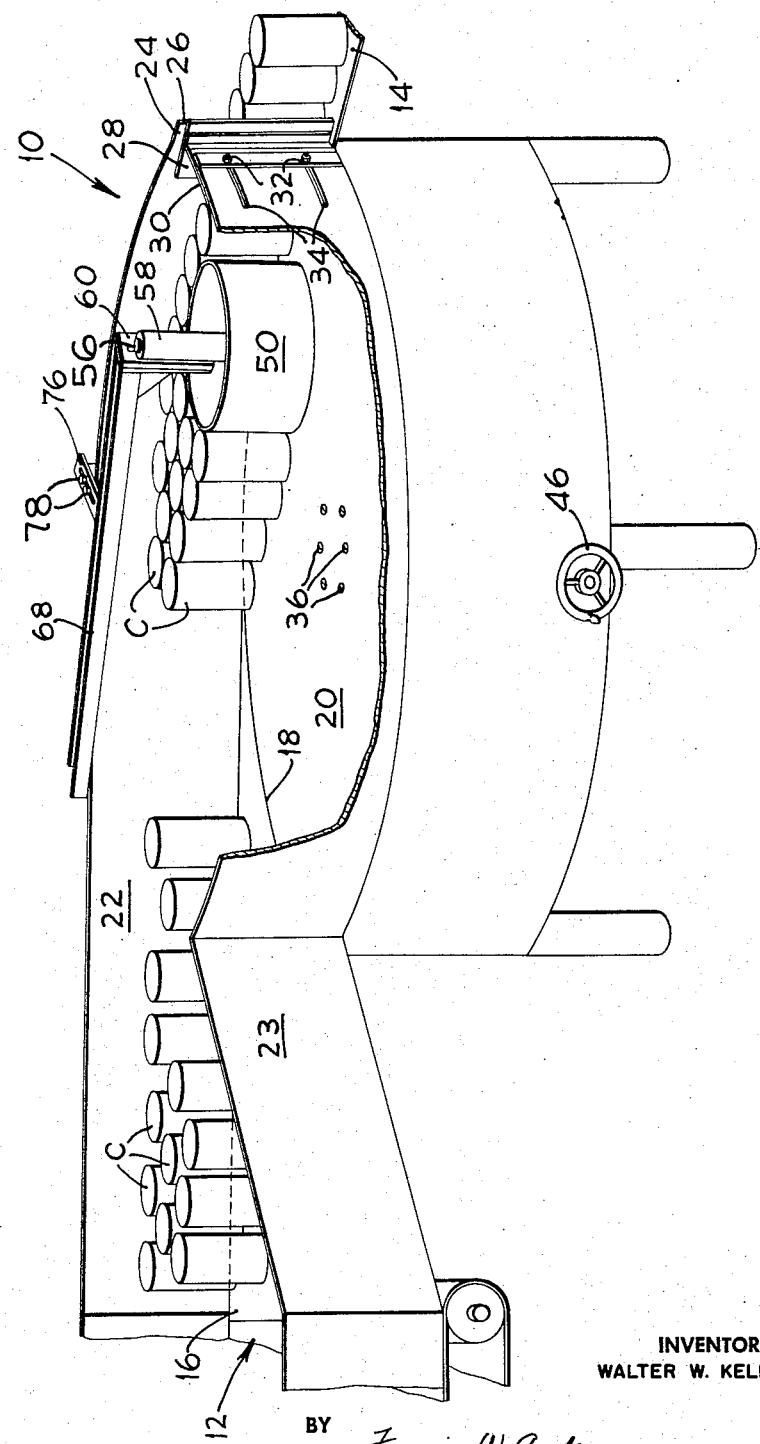

3,357,536
CONTAINER FEEDING MECHANISM
Walter W. Kelly, Portland, Oreg., assignor to FMC Corporation, San Jose, Calif., a corporation of Delaware
Filed Aug. 8, 1966, Ser. No. 570,847
10 Claims. (Cl. 198—30)

ABSTRACT OF THE DISCLOSURE

A titled rotatable drum, mounted on a swing arm over a moving conveying surface, has its lower rim in point contact with a horizontal conveying surface. The axis of the drum is inclined relative to a vertical plane including the longitudinal axis of the swing arm, whereby the resultant force components cause the drum to yieldably drift across the conveying surface. This drifting movement is utilized to gently urge containers on the conveyor laterally of the path of container movement which would occur without the drum and swing arm.

The present invention concerns apparatus for arranging groups of containers, such as cans, into single file for transfer to a filling machine or other apparatus requiring a single file container input.

More specifically, the present invention concerns a container feeding mechanism or "unscrambler" of the rotary-disc type, upon which random groups of containers are fed, and a novel self-driven container pusher or deflector that gently urges the containers outward on the disc for tangential discharge therefrom in single file formation.

Some of the presently available container unscramblers utilize centrifugal force to urge the outermost containers one by one through a narrow aperture in an upstanding wall which circumscribes the disc. One disadvantage of this type of unscrambler is that the disc must rotate relatively fast to spin the containers outward. As a result, the speed of the containers may be faster than the input speed of the machine being fed, and the containers are moved so forcefully that damage can occur to the open ends of relatively frail containers such as open cans, or may break containers of glass. Other container feeding devices of the rotary disc type use container pushing mechanisms comprising springs, belts, or guide walls to force the containers toward the outer edge of the disc. While such devices are generally satisfactory in moving the containers without damage, and in having an output speed which can be adjusted to the input speed of the machine which is fed, many of them are unsatisfactory from the standpoint of cost, complexity or dependability.

Accordingly, an object of the present invention is to provide a rotary disc type of container feeding mechanism having driven container arranging means which requires no separate drive train or power.

Another object of the invention is to provide a rotary disc type of container unscrambling mechanism having a yieldable container pusher which frictionally engages and is driven by the disc.

Another object is to provide a dependable container unscrambling machine which is relatively inexpensive and uncomplicated.

Another object is to provide a container unscrambling machine which can readily be adjusted to handle containers of various sizes and to provide any preselected output speed of containers per minute.

Further objects and advantages of the present invention will become apparent from the following description and from the accompanying drawings, wherein:

FIGURE 1 is a perspective, partly broken away, of the container feeding mechanism of the present invention.

FIGURE 2 is a plan of the apparatus shown in FIGURE 1.

FIGURE 3 is a section taken along lines 3—3 of FIGURE 2.

FIGURE 4 is an elevation, partly broken away, viewed in the direction of the arrows 4—4 on FIGURE 2.

With reference to FIGURES 1 and 2, the container feeding mechanism 10 of the present invention is interposed between a container supply conveyor 12 (FIG. 1) and a downstream filling machine, conveyor, or the like, having an inlet chute 14. Empty, unlidded containers C, such as cans, are moved in random number groups into the container feeding mechanism 10 which arranges the cans into single file and discharges them onto the chute 14. The container feeding mechanism 10 can be precisely adjusted to feed the cans at any usual rate in cans per minute without damage to the cans or blockages of the feeding mechanism.

The feeding mechanism 10 includes a stationary dead plate 16 (FIG. 2) which is arranged, relative to the discharge end of the container supply conveyor 12, so that the cans C slide freely onto the plate 16, and are pushed across the plate by succeeding cans. The dead plate 16 converges toward its inner concave edge 18 which is contiguous to the adjacent edge of a rotatable circular disc 20. The cans C are retained on the dead plate 16 by upstanding side walls 22 and 23, which walls also extend partially around the rotary disc 20 to the vicinity of the chute 14.

An adjustable can discharge throat 24 is provided between the ends of the walls 22 and 23 in alignment with the chute 14 so that a variety of different can sizes can be handled. For this purpose, one side of the throat 24 is formed by the outwardly extending curved end 26 of the side wall 22, and the other side of the throat includes a can guide plate 28 which has an inner end portion extending inwardly over the disc 20. The can guide plate 28 is fixed to an arcuate wall section 30 that is secured by bolts 32 to the adjacent wall 23. Slots 34 in the wall 23 receive the bolts 32 and permit the can guide plate 28 to be moved toward or away from the curved wall end 26. The adjusted dimension of the throat 24 for any given can size is slightly greater than the diameter of the cans.

The disc 20 is secured by bolts 36 (FIG. 2) to an underlying support hub mounted on a drive shaft, neither of which is shown. The disc is constantly driven during operation of the feeding mechanism 10, in the direction of the arrow 38, by means including a reduction gearbox 40, and a variable speed belt and pulley arrangement 42 driven by an electric motor M. The drive pulley 44 on the motor is of the variable pitch type wherein the tension of the belt 46 regulates the interspacing of two halfsheaves. In the present instance, the motor M is mounted on ways, not shown, which permit movement of the motor toward and away from the rotational axis of the disc 20 by means of a handwheel 46. Rotation of the handwheel thus regulates the driven speed of the disc 20, and the peripheral speed of the disc is adjusted to the desired lineal input speed of the cans into the next downstream machine.

At this speed, the centrifugal force is insufficient to positively move the cans outward on the disc 20. Thus, cans which rest on inner portions of the disc, unless they are pushed outward by other cans, require means for urging them outward toward the periphery of the disc. For this purpose, a can deflecting drum 50 is provided to gently urge the cans outward on the disc 20, whereby the unlidded, relatively frail cans are positioned for discharge in single file through the throat 24. In the event that the table is substantially covered with cans, the can deflecting drum 50 is arranged to be inwardly displaced by the cans. A particular feature of the present invention is that the can deflecting drum 50 is powered by frictional contact with the upper surface of the disc 20 such that it always provides a positive outward thrust against the cans. Thus, any number of cans which may be in positions between the drum 50 and the side wall 22 are continuously moved toward the periphery of the drum for subsequent discharge.

The can deflecting drum 50 (FIGS. 2–4) is formed of a circular bottom disc 52 to which are secured a circumferential wall 54 and a central upstanding shaft 56. The shaft 56 is freely rotatable in a tubular bearing 58 that is welded to a mounting plate 60. Two vertically spaced bolts 62 are welded in apertures of the plate 60, and the lower bolt extends through a horizontally elongate slot 64 in a similar plate 66 which is perpendicular to the disc 20. The upper bolt functions as a pivot for the mounting plate 60, whereby the mounting plate can be adjusted to a desired amount of tilt relative to the upright plate 66 so that the under surface of the can deflecting drum 50 is in non-parallel relation with the upper surface of the disc 20. Gravity maintains the drum 50 in frictional engagement with the disc 20.

The upright plate 66 is secured to the free end of a swing arm 68 which has a depending pivot shaft 70 freely rotatable in a bearing sleeve 72. The bearing sleeve rests in an angle bracket 74 that is secured to the side wall 22, and the distance between the turning axes of the pivot shaft 70 and the drum shaft 56 is the same as the distance between the turning axes of the pivot shaft 70 and the disc 20.

The can deflecting drum 50 can be swung between the FIGURE 2 phantom line position and the full line position. In the latter position, the distance between the exterior upright wall surface of the drum 50 and the interior surface of the wall 22 is the same as the outside diameter of the cans C. This distance can be changed to accommodate cans of other diameters by appropriately positioning a movable slotted stop bar 76, which is held by bolts 78 to a bracket 80 on the wall 22 and has an inner end lying in the path of the swing arm 68.

As shown in FIGURE 4, the can deflecting drum 50 is tilted so that its undersurface angles upwardly away from its point of contact at 82 with the disc 20. The upper surface of the disc 20 is indicated by the reference line 84, and the undersurface of the drum is indicated by the reference line 86. The highest lower edge point on the drum 50 may be approximately one-eighth of an inch from the upper surface of the disc 20.

Assuming that the can deflecting drum 50 is in FIGURE 2 solid line position and that the disc 20 is being driven, the frictional engagement of the drum with the disc at the contact point 82 will cause the drum to rotate about the shaft 56 in the same direction as the disc 20. Considering the contact point on the disc surface relative to the contact point on the drum 50, it will be evident that sidewise slippage of the movable deflecting drum 50 on the disc surface will occur, since the radius of the drum is smaller than an imaginary radius drawn from the pivot axis of the disc through the contact point at 82. This slippage produces a frictional force component that urges the can deflecting drum 50 outward or away from the pivot axis of the disc 20, and the cans C which lie between the confronting surfaces of the drum 50 and the side wall 22 are thus urged toward the periphery of the disc so that they will eventually contact the can guide plate 28 and be guided through the discharge throat 24. The cans at C', unless they interdigitate with the outer row of cans, will displace the can deflecting drum 50 inward and will rotate with the disc 20. These cans mingle with more incoming cans and are eventually again subjected to the outward pushing action of the can deflecting drum 50.

If it happens that a full charge of cans accumulate on the disc 20 and displace the can deflecting drum 50 to the phantom line dead center position shown in FIGURE 2, there is very little lateral drive force on the drum 50. However, the drum will not remain idle in this position because the outer layer of cans at one side of the disc 20 are being discharged through the throat 24, while cans at the opposite side of the disc tend to push the drum away from the dead center position. As soon as the drum moves away from dead center, the lateral swing force progressively increases the farther the drum drifts from dead center.

It is important to note that the side of the drum 50 which contacts the cans C is moving in the same direction as the cans, whereby the cans at C'' tend to revolve and roll along the wall 22 rather than merely slide against it. This tends to promote smooth flow of the cans and to prevent blockages.

By way of summarizing and emphasizing the novel features of the present invention, the disc 20 is operated at a peripheral speed approximating the desired output in numbers of cans per minute. This speed is too low to spin the cans away from the center of the disc 20, and the peripheral speed of the disc is low enough to assure that the cans C will not dent one another or be dented by any fixed obstructions. The can deflecting drum 50 supported and rotated by the disc 20 and mounted on the swing arm 68 tends to drift toward the periphery of the disc because the drum is tilted so as to have only point contact with the disc. The drum thus pushes the cans toward positions where they will be intercepted by the guide plate 28 and ejected through the discharge throat 24. If the can supply on the disc 20 builds up more rapidly than the rate at which the cans be discharged from the disc, the can deflecting drum 50 will yield inwardly and be pushed by the cans toward the center of the disc, and the cans are recirculated and moved outwardly as the outer row of cans is depleted by being discharged through the throat 24. Although the pushing action of the can deflecting drum 50 is constant, it is gentle enough to prevent can damage, and the drum in any portion of its arcuate swinging travel across the disc can be displaced by excess cans between the drum and the adjacent wall 22.

While a particular embodiment of the present invention has been herein shown and described it will be apparent that modification and variation may be made without departing from the spirit of the invention, and that the scope of the invention should be limited only by proper interpretation of the claims appended thereto.

Having thus described the invention, that which is believed to be new, and for which protection by Letters Patent is desired, is:

1. Container feeding apparatus comprising a driven conveyor having a conveying surface arranged to convey upright containers along a predetermined path, an elongate swing arm mounted for swinging movement in a horizontal plane over said conveying surface, and a container deflecting drum carried by said swing arm and supported by said conveying surface, said drum being rotatable about an axis inclined from the vertical so that the drum is in point contact engagement with said conveying surface, said contact point being laterally displaced from a vertical plane including said swing arm such that the drum tends to move across said conveying surface.

2. Apparatus according to claim 1 wherein said conveyor is a driven disc rotatable about a vertical axis for carrying the containers in an arcuate path.

3. Apparatus according to claim 2 wherein said contact point is at that side of said drum which is remote from the vertical turning axis of said disc.

4. Apparatus according to claim 3 and further including means defining a container outlet throat for said disc, an upstanding wall partially circumscribing one side of said disc and terminating at said outlet throat, means defining a pivot axis for said swing arm on said wall, and an inwardly projecting stop member mounted on said wall in the plane of movement of said arm, said stop member being movable to adjusted positions to arrest said arm and thus regulate the interspacing between said drum and said wall.

5. Apparatus according to claim 4 wherein the end portion of said wall defines one lateral limit of said outlet throat, a second upstanding wall partially circumscribing the other side of said disc, an arcuate wall section secured to said second wall and adjustably positionable toward and away from said outlet throat, and a container guide plate secured to said arcuate wall, said guide plate defining the other lateral limit of said outlet throat and projecting inwardly over said disc in the path of movement of a container supported by the outermost peripheral area of said disc, said guide plate being diagonally related to the path of movement of said container so as to cam the container through said outlet throat.

6. A container feeding mechanism for arranging random numbers of upright containers into single file, comprising a rotatable disc adapted to convey the containers in an arcuate path from an inlet conveyor to an outlet throat, a shaft defining a vertical turning axis for said disc, power means coupled to said shaft for rotating said disc at a predetermined speed, an arm mounted for horizontal swinging movement over said table, first pivot means defining a swing axis for said arm adjacent the periphery of said disc, a container deflecting drum carried by the free end of said arm, and second pivot means mounted on the free end of said arm and defining a turning axis for said drum, said latter axis being inclined relative to the turning axis of said disc and movable about said first pivot means in an arcuate path which intersects said vertical axis, said drum having frictional point contact with said disc in a sector of the drum which is laterally displaced from said pivot arm whereby the drum is rotated by the disc and the frictional force thus developed causes the drum to be driven outward across the disc.

7. The apparatus of claim 6 and further including a wall extending along the edge of said disc adjacent said drum between the conveyor and said outlet throat, said wall defining one limit of said outlet throat, and a guide plate defining the other limit of said outlet throat for intercepting and guiding those containers which are in engagement with said wall through said outlet throat.

8. Apparatus according to claim 7 wherein said guide means is horizontally movable relative to the adjacent wall so that the outlet throat can be preset to accommodate containers of various diameters, and further including a stop bar mounted adjacent the periphery of said disc in the plane of movement of said arm, said stop bar being movable to preselected adjusted positions in which outward movement of the arm is blocked to regulate the interspacing of said drum and said wall, thus accommodating containers of different diameters intermediate the confronting surfaces of said drum and said wall.

9. In a mechanism for urging containers into single file: means providing a guide member adapted to guide the containers along a fixed path in a single file; and means for applying pressure against the containers to urge a line of containers against said guide member including a support arm, means providing a pivot axis for one end of said support arm, a container-engaging member secured to the other end of said arm, and actuating mechanism for swinging said arm about said pivot axis in a direction to cause said container-engaging member to apply pressure to the containers, said actuating mechanism including means for applying a frictional driving force to said arm to urge it in said direction.

10. Apparatus according to claim 9 wherein said frictional driving force derives from a moving conveying surface in contact with said container engaging member and supporting said containers.

References Cited
UNITED STATES PATENTS

| | | | |
|---|---|---|---|
| 2,881,897 | 4/1959 | Thulke | 198—30 |
| 3,292,765 | 12/1966 | Loveless | 198—30 |

FOREIGN PATENTS

| | | |
|---|---|---|
| 872,301 | 3/1953 | Germany. |

RICHARD E. AEGERTER, *Primary Examiner.*